L. GRAHAM.
Wagon Seat.
No. 78,590.
Patented June 2, 1868.
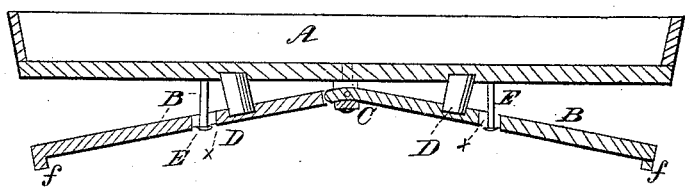
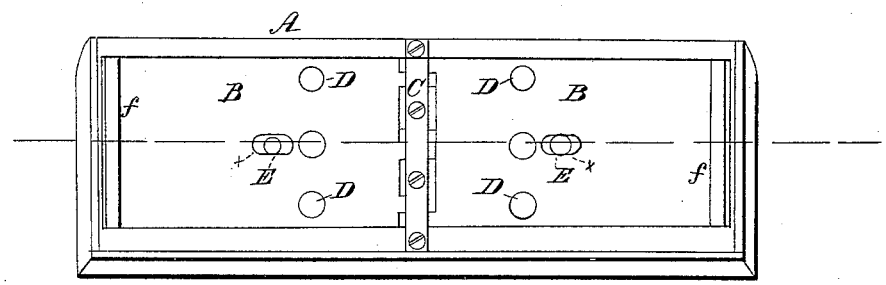

United States Patent Office.

LEWIS GRAHAM, OF PLYMOUTH, ILLINOIS.

*Letters Patent No. 78,590, dated June 2, 1868.*

---

IMPROVEMENT IN WAGON-SEAT.

---

The Schedule referred to in these Letters Patent and making part of the same.

---

TO ALL WHOM IT MAY CONCERN:

Be it known that I, LEWIS GRAHAM, of Plymouth, in the county of Hancock, and in the State of Illinois, have invented certain new and useful Improvement in Wagon-Seat; and do hereby declare that the following is a full, clear, and exact description thereof, reference being had to the accompanying drawings and the letters of reference marked thereon.

In the annexed drawings, making a part of this specification, A represents an ordinary wagon or carriage-seat, constructed in any known or usual manner and form, having a straight or regular bottom-board; and B B represent levers, made as wide as may be required, hinged or pivoted in the middle of the seat A by means of a cross-bar, C, as shown in the drawings, or in any other convenient manner, and extending thence both ways as far as the ends of the said seat A, or any required distance. These levers B B are each provided with a slot, $x$, and cross-cleat, $f$, or other device, for securing the seat to the body of a carriage or wagon.

At a suitable distance from the middle of the seat A, I place and secure rubber springs, D D, which may be either cylindrical, as shown in the drawings, globular, or of any shape that may be most convenient and desirable. These springs are placed and secured between the seat A and the levers B B, as will be seen by reference to the drawings.

Secured in the bottom of the seat A are bolts, E E, which pass through the slots $x$ $x$ of the levers B B, and, by means of suitable heads thereon, serve to keep the seat and levers from springing too far apart, and thereby detaching them from the springs D D.

By the above-described means I construct a very simple, cheap, and desirable spring or elastic seat for vehicles.

Having thus fully described my invention, what I claim as new, and desire to secure by Letters Patent, is—

The levers B B, slotted and hinged at their inner ends to the wagon-seat A, with the stationary headed bolts E E and tubular rubber springs D D, arranged and used as and for the purposes set forth.

In testimony that I claim the foregoing, I have hereunto set my hand, this 26th day of December, 1867.

LEWIS GRAHAM.

Witnesses:
   A. J. DUNCAN,
   J. A. HAMILTON.